United States Patent
Menon et al.

(10) Patent No.: US 7,063,905 B2
(45) Date of Patent: Jun. 20, 2006

(54) FUEL CELL $H_2$ EXHAUST CONVERSION

(75) Inventors: Prem Menon, Rochester, NY (US); Norman J Dill, Walworth, NY (US); Daryl Chapman, Victor, NY (US)

(73) Assignee: General Motors Corporation, Detroit, MI (US)

( * ) Notice: Subject to any disclaimer, the term of this patent is extended or adjusted under 35 U.S.C. 154(b) by 108 days.

(21) Appl. No.: 10/352,348

(22) Filed: Jan. 27, 2003

(65) Prior Publication Data

US 2004/0146758 A1    Jul. 29, 2004

(51) Int. Cl.
*H01M 8/18* (2006.01)
*H01M 8/04* (2006.01)
*H01M 8/10* (2006.01)

(52) U.S. Cl. .................. 429/17; 429/32; 429/33; 429/34; 429/40; 429/41; 429/44; 429/38; 429/19; 429/30

(58) Field of Classification Search .............. 429/17, 429/19, 39, 34, 38, 30, 22
See application file for complete search history.

(56) References Cited

U.S. PATENT DOCUMENTS

| 5,221,586 A * | 6/1993 | Morimoto et al. ........... 429/20 |
| 6,623,880 B1 * | 9/2003 | Geisbrecht et al. .......... 429/12 |
| 2003/0054211 A1 * | 3/2003 | Charlat ....................... 429/13 |

OTHER PUBLICATIONS

1612/Research Disclosure, Dec. 1999, Hydrogen Recovery.

* cited by examiner

*Primary Examiner*—Patrick Joseph Ryan
*Assistant Examiner*—Angela J. Martin
(74) *Attorney, Agent, or Firm*—Harness, Dickey & Pierce, P.L.C.

(57) ABSTRACT

A fuel cell system having first and second fuel cells that each receive anode reactant flows and cathode reactant flows. Each of the fuel cells uses the reactant flows to produce electricity. The electricity production by the fuel cells produces respective first and second anode and cathode effluents that are exhausted from the respective fuel cells. The second fuel cell is connected to and downstream from the first fuel cell so that the anode reactant flow to the second fuel cell is formed from a portion of the anode effluent exhausted from the first fuel cell.

28 Claims, 1 Drawing Sheet

FUEL CELL H₂ EXHAUST CONVERSION

FIELD OF THE INVENTION

The present invention relates to fuel cell systems and, more particularly, to fuel cell systems that have fuel cells that produce an anode effluent.

BACKGROUND OF THE INVENTION $H_2$—$O_2$(air) fuel cells are well known in the art and have been proposed as a power source for many applications. There are several types of $H_2$—$O_2$ fuel cells including acid-type, alkaline-type, molten-carbonate-type, and solid-oxide-type. So called PEM (proton exchange membrane) fuel cells [a.k.a. SPE (solid polymer electrolyte) fuel cells] are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. A plurality of individual cells are commonly bundled together to form a PEM fuel cell stack.

In PEM fuel cells hydrogen is the anode reactant (i.e., fuel) and oxygen is the cathode reactant (i.e., oxidant). The oxygen can either be in a pure form (i.e., $O_2$), or air (i.e., $O_2$ admixed with $N_2$). The solid polymer electrolytes are typically made from ion exchange resins such as perfluoronated sulfonic acid. The anode/cathode typically comprise finely divided catalytic particles (often supported on carbon particles) admixed with proton conductive resin.

During the conversion of the anode reactant and cathode reactant to electrical energy, the fuel cell, regardless of the type, produces anode and cathode effluents that are exhausted from the fuel cell. The anode effluent typically contains unused hydrogen that represents an unused source of energy. The cathode effluent typically contains excess oxygen or air that was not consumed during the electricity production in the fuel cell. The amounts of hydrogen and oxygen remaining in the anode and cathode effluents is dependent upon a number of factors and will vary. For example, the efficiency of the fuel cell can impact the amount of hydrogen and oxygen that are exhausted in the respective anode and cathode effluents. Additionally, the stoichiometry of the fuel cell stack (i.e., the amounts of hydrogen and oxygen that are included in the respective anode and cathode reactants) will also effect the amount of remaining hydrogen and oxygen in the respective anode and cathode effluents.

The hydrogen in the anode effluent represents a source of energy that can be converted into a more usable form. Typical fuel cell systems employ a tail gas combustor to convert the hydrogen in the anode effluent into heat that can be used in other parts of the fuel cell system. However, the conversion of the excess hydrogen to heat may not be the most efficient use of the energy contained in the anode effluent. The tail gas combustor produces emissions that may require additional processing before the emissions can be vented to the environment. The heat generated by the combustor, may only be needed during certain aspects of operating the fuel cell system, such as at start up, and thereafter become a source of lost energy in the form of heat that must be dissipated from the fuel cell system. The tail gas combustor operates at high temperature. The use of a tail gas combustor also requires additional controls and/or control schemes that differ from the controls and/or control schemes to operate the fuel cells. All of the above considerations increase the complexity of a fuel cell system incorporating a tail gas combustor. Therefore, it would be desirable to convert the energy in the anode effluent into a more useful form without the necessity of creating excess heat, emissions and/or requiring additional and/or different controls/control schemes.

SUMMARY OF THE INVENTION

The present invention eliminates the need for the tail gas combustion process in a fuel cell system. The invention allows the excess hydrogen in the anode effluent to be converted directly to low voltage electricity with minimal controls and no excess combustion heat or emissions. The low voltage generated can be used for battery charging and/or other ancillary power needs within the fuel cell system and/or an apparatus within which the fuel cell system is operating.

A fuel cell system according to the principles of the present invention comprises a first fuel cell having a first anode inlet that receives a first anode reactant flow and a first cathode inlet that receives a first cathode reactant flow. The first fuel cell reacts the first anode and cathode reactant flows to produce electricity, a first anode effluent exhausted from a first anode outlet and a first cathode effluent exhausted from a first cathode outlet. A second fuel cell has a second anode inlet that receives a second anode reactant flow and a second cathode inlet that receives a second cathode reactant flow. The second fuel cell reacts the second anode and cathode reactant flows to produce electricity, a second anode effluent that is exhausted from a second anode outlet and a second cathode effluent that is exhausted from a second cathode outlet. The first anode outlet is in fluid communication with the second anode inlet so that a portion (partial or entire) of the second anode reactant flow received in the second fuel cell is formed from a portion (partial or entire) of the first anode effluent exhausted from the first fuel cell.

The invention also discloses a method of converting an anode effluent exhausted from a primary fuel cell in a fuel cell system into an electrical current. The method includes the steps of: (1) routing a portion of the anode effluent exhausted from a primary fuel cell to a secondary fuel cell; (2) supplying the secondary fuel cell with a cathode reactant flow; and (3) converting the portion of the anode effluent and the cathode reactant flow to electricity in the secondary fuel cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
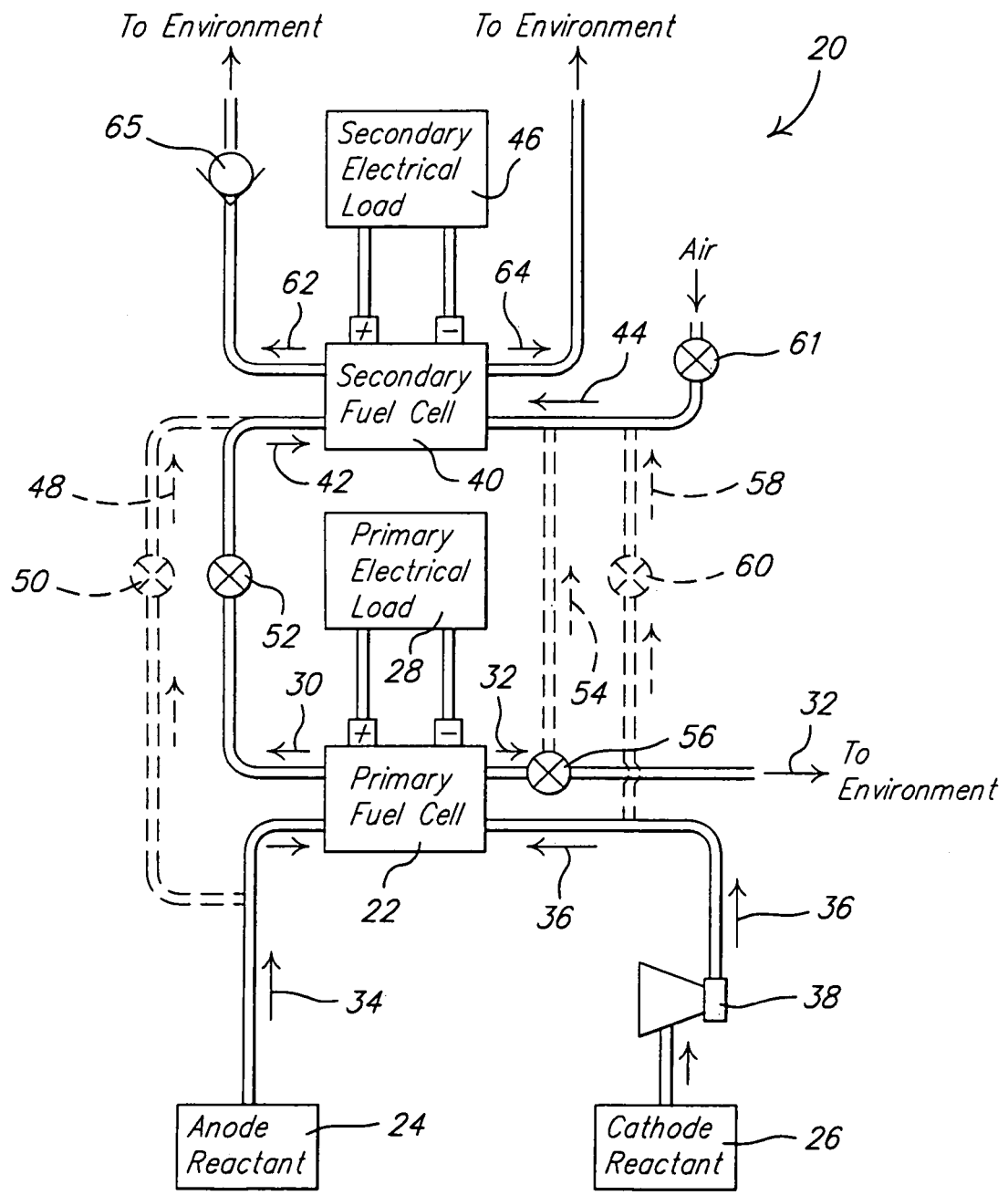
FIG. 1 is a schematic representation of a first preferred embodiment of the fuel cell system according to the principles of the present invention utilizing a single secondary fuel cell.

The following description of the preferred embodiments is merely exemplary in nature and is in no way intended to limit the invention, its application, or uses.

Referring to FIG. 1, a fuel cell system 20 in accordance with the principles of the present invention is shown. The fuel cell system 20 has a primary fuel cell 22 that converts an anode reactant 24 and a cathode reactant 26 into electricity to power a primary electrical load 28. The primary electrical load 28 can take a variety of forms depending upon the application within which the fuel cell system 20 is employed. For example, the primary electrical load 28 can be electric motors that are used to propel a vehicle, or other apparatuses that require an electrical current to be operated. The process of converting the anode reactant 24 and the cathode reactant 26 into electricity also produces an anode effluent 30 and a cathode effluent 32 that are exhausted from the primary fuel cell 22. The anode reactant 24 is a fuel source that contains hydrogen ($H_2$) and the cathode reactant 26 is an oxidation agent that contains oxygen ($O_2$). The oxygen in the cathode reactant 26 can be in the form of pure $O_2$ or can be air ($O_2$ admixed with $N_2$). The anode reactant 24 supplies an anode feed stream or reactant flow 34 to the primary fuel cell 22 and the cathode reactant 26 supplies a cathode feed stream or reactant flow 36 to the primary fuel cell 22 that are converted to electricity. Cathode reactant flow 36 can be provided via an optional compressor 38. The above described operation of the primary fuel cell 22 is known in the art and will not be described further.

The $H_2$ that is supplied as the anode reactant 24 can come from a variety of sources. For example, the $H_2$ can come from a pure $H_2$ source, such as liquid hydrogen from a storage tank, or can be reformed from another fuel source, such as gasoline, methanol, ethanol, or other fuel sources as is known in the art.

As was stated above, when the primary fuel cell 22 uses the anode reactant flow 34 and the cathode reactant flow 36 to produce electricity, an anode effluent 30 and a cathode effluent 32 are also produced and exhausted by the primary fuel cell 22. Due to the operating conditions and fuel cell efficiencies, the anode effluent 30 typically contains unused $H_2$ and the cathode effluent 32 contains unused $O_2$. The fuel cell system 20 of the present invention uses the anode effluent 30 to produce additional electricity for the fuel cell system 20 or the apparatus within which the fuel cell system 20 is employed. To accomplish this, the fuel cell system 20 employs a secondary fuel cell 40 that, like the primary fuel cell 22, takes an anode reactant flow and a cathode reactant flow and converts them to electricity. That is, the secondary fuel cell 40 is provided with a secondary anode feed stream or reactant flow 42 and a secondary cathode feed stream or reactant flow 44 that the secondary fuel cell 40 converts into electricity that can be used to provide electrical current to a secondary electrical load 46 or a storage device such as a battery. The secondary fuel cell 40 uses the $H_2$-containing anode effluent 30 exhausted by the primary fuel cell 22 as at least a portion of the secondary anode reactant flow 42 so that the unused $H_2$ within the anode effluent 30 can be converted to electricity. Preferably, the entire secondary anode reactant flow 42 is provided by the anode effluent 30.

Optionally, however, the secondary anode reactant flow 42 can be supplemented by the anode reactant flow 34. That is, a portion 48 of the anode reactant flow 34 can be routed to the secondary fuel cell 40 as a part of the secondary anode reactant flow 42. Preferably, a control valve 50 controls the portion 48 of the anode reactant flow 34 that is routed to the secondary fuel cell 40. The control valve 50 is operated so that the amount of $H_2$ that is provided to the secondary fuel cell 40 from the anode reactant flow 34 via the portion 48 is low enough so that the secondary fuel cell 40 can convert most or all of the $H_2$ contained within the secondary anode reactant flow 42 into electricity.

Optionally, but preferably, a control valve 52 is disposed between the primary fuel cell 22 and the secondary fuel cell 40 and controls the amount of anode effluent 30 that is exhausted by the primary fuel cell 22. In operation, the control valve 52 can regulate the amount of anode effluent 30 exhausted from the primary fuel cell 22. In one mode of operation, the control valve 52 is used to prevent the exhaust of anode effluent 30 from the primary fuel cell 22. In this mode, the control valve 52 is closed while the primary fuel cell 22 converts the reactants within the primary fuel cell 22 into electricity and periodically opens to "burp" the primary fuel cell 22. The burping of the primary fuel cell 22 is performed to increase the residence time of the anode reactant flow 34 and to increase the efficiency of the primary fuel cell 22 so that the anode effluent 30 contains a minimal amount of $H_2$.

Preferably, the secondary fuel cell 40 is supplied with a secondary cathode reactant flow 44 that is drawn from the ambient air within which the fuel cell system 20 is employed. When the secondary cathode reactant flow 44 is drawn from the ambient air, a blower (not shown) and/or other hardware may be needed to propel the flow of the ambient air into the secondary fuel cell 40 via the secondary cathode reactant flow 44. A blower is preferred over the use of a compressor due to the decreased energy consumption associated with the operation of a blower. Optionally, the secondary cathode reactant flow 44 can be supplemented with a portion 54 of the cathode effluent 32 that is exhausted from the primary fuel cell 22. The portion 54 of the cathode effluent 32 that is used to supplement the secondary cathode reactant flow 44 can be either an entire portion of the cathode effluent 32 or less than the entire portion of the cathode effluent 32. When it is desired to provide less than the entire portion of the cathode effluent 32 to supplement the secondary cathode reactant flow 44, a control valve 56 is preferably disposed between the cathode effluent 32 and the secondary cathode reactant flow 44. The control valve 56 can regulate the amount of cathode effluent 32 that is used to supplement the secondary cathode reactant flow 44.

Alternatively, and/or additionally, the secondary cathode reactant flow 44 can also be supplemented from the cathode reactant flow 36 that is provided via the compressor 38. That is, a portion 58 of the cathode reactant flow 36 can be routed to the secondary fuel cell 40 via the secondary cathode reactant flow 44. When the secondary cathode reactant flow 44 is supplemented by the portion 58 of the cathode reactant flow 36, a control valve 60 is disposed between the cathode reactant flow 36 and the secondary cathode reactant flow 44. The control valve 60 controls the portion 58 of the cathode reactant flow 36 that is used to supplement the secondary cathode reactant flow 44. Optionally, the secondary cathode reactant flow 44 can be provided entirely by the portion 54 of the cathode effluent 32 and/or the portion 58 of the cathode reactant flow 36. A valve 61 can be provided on the ambient air intake to the secondary fuel cell 40. Valve 61 can be closed to prevent portion 54 of cathode effluent 32 and/or portion 58 of cathode reactant flow 36 from being exhausted from fuel cell system 20 via the air intake when the secondary cathode reactant flow 44 is being supplemented by portion 54 of cathode effluent 32 and/or portion 58 of cathode reactant flow 36. Valve 61 can be opened to allow secondary cathode reactant flow 44 to be drawn from the ambient air within which fuel cell system 20 is employed. Therefore, the secondary fuel cell 40 can be provided with a secondary cathode reactant flow 44 that is comprised of ambient air and/or the portion 54 of the cathode effluent 32 and/or the portion 58 of the cathode reactant flow 36.

As was stated above, the secondary fuel cell 40 uses the secondary anode reactant flow 42 and the secondary cathode reactant flow 44 to produce electricity to power the secondary electrical load 46. The production of electricity within the secondary fuel cell 40 results in the production of a secondary anode effluent 62 and a secondary cathode effluent 64 that are exhausted from the secondary fuel cell 40. The secondary anode and cathode effluents 62, 64 are exhausted to the environment within which the fuel cell system 20 is operating. The secondary fuel cell 40 is sized and/or operated so that all of the $H_2$ contained within the secondary anode reactant flow 42 is consumed during the electricity production within the secondary fuel cell 40 so that the secondary anode effluent 62 is substantially free of $H_2$. The fuel system 20 will thereby consume a majority or all of the $H_2$ that is supplied by the anode reactant flow 34 and result in a fuel cell system 20 that exhausts little or no unused $H_2$. As a result, the fuel system 20 does not employ a tail gas combustor to extract energy from the $H_2$ exhausted by conventional fuel cell systems 20. Preferably, the secondary anode effluent 62 exhausted by the secondary fuel cell 40, passes through a check valve 65 prior to being exhausted to the environment. The check valve 65 prevents back flow within the anode portions of the secondary fuel cell 40 and the primary fuel cell 22 and thereby prevents contamination of the secondary fuel cell 40 and the primary fuel cell 22.

Preferably, the primary fuel cell 22 is a PEM fuel cell. However, it should be understood that the primary fuel cell 22 can be any type of fuel cell that uses $H_2$ as a reactant and $O_2$ (or air) as an oxidant to produce electricity, and still be within the scope of the present invention. Preferably, the secondary fuel cell 40 is the same type of fuel cell as the primary fuel cell 22. However, it is not necessary for the secondary fuel cell 40 and the primary fuel cell 22 to be the same type of fuel cell to be within the scope of the present invention. That is, the secondary fuel cell 40 can be a different type of fuel cell from the primary fuel cell 22 provided that the secondary fuel cell 40 also utilizes $H_2$ as a reactant and $O_2$ (or air) as an oxidant in the reaction within the secondary fuel cell 40 to produce electricity. Preferably, the secondary fuel cell 40 is sized to be a lower power fuel cell than the primary fuel cell 22. Furthermore, the secondary fuel cell 40 can also be designed to operate differently from the primary fuel cell 22. For example, the secondary fuel cell 40 may have different pressure requirements, temperature requirements, cooling requirements, efficiencies, etc.

Regardless of the type or size of the primary and secondary fuel cells 22, 40, the fuel cell system 20 is designed so that the secondary anode effluent 62 that is exhausted by the secondary fuel cell 40 is substantially free of $H_2$ so that the fuel cell system 20 is more efficient and very little or no $H_2$ provided by the anode reactant flow 34 is exhausted to the environment. The size of the primary fuel cell 22 and the secondary fuel cell 40 will be dependent upon the application within which the fuel cell system 20 is employed. That is, the primary fuel cell 22 will be sized to provide the primary electrical load 28 with enough electricity to operate within the design parameters and the secondary fuel cell 40 will be sized to provide a secondary anode effluent 62 that is substantially free of $H_2$. Because it is preferred that the secondary fuel cell 40 be a lower power fuel cell than the primary fuel cell 22, it is expected that the secondary fuel cell 40 will be used to provide electricity to a secondary electrical load 46 that is an ancillary component to the fuel cell system 20 and/or the apparatus within which the fuel cell 20 is operating which will require less power from the secondary fuel cell 40. For example, the secondary electrical load 46 may be a battery that is contained within the apparatus within which the fuel cell system 20 is employed and the secondary fuel cell 40 is used to recharge the battery. However, it should be understood that the primary and secondary electrical loads 28, 46 will vary depending upon the application within which the fuel cell system 20 is employed and that the primary and secondary electrical loads 28, 46 can take on a variety of forms and still be within the scope of the present invention.

The fuel cell system 20 illustrated in FIG. 1 utilized one secondary fuel cell 40. Optionally, the fuel cell system 20 can employ multiple secondary fuel cells 40. The plurality of secondary fuel cells 40 may be arranged in a parallel configuration, in a series configuration or in a combination of parallel and series configuration. In such an arrangement, each of the plurality of secondary fuel cells 40 are used as a source of electricity for a plurality of secondary electrical loads 46 and designed to consume substantially all of the $H_2$ supplied to the fuel cell system 20 by the anode reactant flow 34. When a plurality of secondary fuel cells 40 are utilized, similar hardware and mechanization will be needed.

When a parallel configuration is utilized, the plurality of secondary fuel cells 40 are arranged downstream of the primary fuel cell 22 and in parallel with one another such that the secondary fuel cells 40 divide the anode effluent 30 exhausted by the primary fuel cell 22 for use as an anode reactant flow to each of the secondary fuel cells 40. More specifically, the anode effluent 30 exhausted by the primary fuel cell 22 is routed to all of the secondary fuel cells 40 so that each of the secondary fuel cells 40 use different portions of the anode effluent 30 as an anode reactant flow to produce electricity.

When a series configuration is utilized, the secondary fuel cells 40 are arranged downstream of the primary fuel cell 22 with each of the secondary fuel cells 40 arranged in a series configuration with the anode effluent exhausted by a preceding upstream secondary fuel cell 40 used as an anode reactant flow for a subsequent downstream secondary fuel cell 40. Each of the plurality of secondary fuel cells 40 also receives a cathode reactant flow.

The plurality of secondary fuel cells 40 can all be the same type of fuel cell or can each be different types of fuel cells that use $H_2$ as an anode reactant and $O_2$ (or air) as a cathode reactant. Preferably, the plurality of secondary fuel cells 40 are lower power fuel cells than the primary fuel cell 22.

Referring to FIG. 1, the operation of the fuel cell system 20 of the present invention will now be discussed. The primary fuel cell 22 is provided with an anode reactant flow 34 from the anode reactant 24 and also a cathode reactant flow 36 from the cathode reactant 26 via the optional compressor 38. The primary fuel cell 22 then converts the anode and cathode reactant flows 34, 36 into electricity to meet the primary electrical load 28. The production of electricity within the primary fuel cell 22 produces anode and cathode effluents 30, 32. The anode effluent 30 is routed to the secondary fuel cell 40 where it is used as a secondary anode reactant flow 42. The routing of the anode effluent 30 from the primary fuel cell 22 to the secondary fuel cell 40 is controlled by the control valve 52 which can be used to "burp" the primary fuel cell 22. Optionally, the secondary anode reactant flow 42 can be supplemented by routing a portion 48 of the anode reactant flow 34 directly to the secondary fuel cell 40 to mix with the anode effluent 30 exhausted from the primary fuel cell 22 to form the secondary anode reactant flow 42. The supplementing of the secondary anode reactant flow 42 with a portion 48 of the anode reactant flow 34 is controlled by the control valve 50. Typically, the secondary anode reactant flow 42 will not be supplemented with the portion 48 of the anode reactant flow 34.

The cathode effluent 32 produced by the primary fuel cell 22 is preferably exhausted to the environment and the secondary fuel cell 40 will use a secondary cathode reactant flow 44 that is air drawn from the environment within in which the fuel cell system 20 is employed. However, it may be desirable to supplement and/or replace the air that comprises the secondary cathode reactant flow 44 with the cathode effluent 32 and/or the cathode reactant flow 36. Therefore, the cathode effluent 32 exhausted by the primary fuel cell 22 can be routed via control valve 56 to the cathode inlet of the secondary fuel cell 40 to act as part or all of the secondary cathode reactant flow 44. Also, a portion 58 of the cathode reactant flow 36 can be routed to the cathode inlet of the secondary fuel cell 40 via control valve 60 to form a part or all of the secondary cathode reactant flow 44. The secondary fuel cell 40 then uses the secondary anode reactant flow 42 and the secondary cathode reactant flow 44 to produce electricity. The production of electricity within the secondary fuel cell 40 produces secondary anode and cathode effluents 62, 64 that can be exhausted to the environment. The secondary anode effluent 62 is routed through a check valve 65 to prevent back flow contamination of the secondary fuel cell 40 and the primary fuel cell 22.

The secondary fuel cell 40, is designed to enable the secondary fuel cell 40 to consume most or all of the $H_2$ contained within the secondary anode reactant flow 42 so that the secondary anode effluent 62 exhausts by the secondary fuel cell 40 is substantially free of $H_2$. The fuel cell system 20 thereby provides a means of using most or all of the $H_2$ exhausted by the primary fuel cell 22 in the anode effluent 30 to produce useful energy in the form of electricity.

The above described fuel cell system 20 made according to the principals of the present invention provides a fuel cell system 20 that can meet the primary electrical load 28 while producing a secondary anode effluent 62 that contains very little or no unused $H_2$.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
a first fuel cell having a first anode inlet receiving a first anode reactant flow and a first cathode inlet receiving a first cathode reactant flow, said first fuel cell reacting said first anode and cathode reactant flows to produce electricity, a first anode effluent exhausted from a first anode outlet and a first cathode effluent exhausted from a first cathode outlet; and
a second fuel cell having a second anode inlet receiving a second anode reactant flow and a second cathode inlet receiving a second cathode reactant flow, said second fuel cell reacting said second anode and cathode reactant flows to produce electricity, a second anode effluent exhausted from a second anode outlet and a second cathode effluent exhausted from a second cathode outlet,
wherein said first and second fuel cells are a same type of fuel cell, said first anode outlet is in fluid communication with said second anode inlet so that a portion of said second anode reactant flow received in said second fuel cell is formed from a portion of said first anode effluent exhausted from said first fuel cell, and wherein said second fuel cell is a lower power fuel cell than said first fuel cell, and said first cathode outlet is in fluid communication with said second cathode inlet so that a portion of said second cathode reactant flow received in said second fuel cell is formed from a portion of said first cathode effluent exhausted from said first fuel cell.

2. The fuel cell system of claim 1, further comprising a control valve interposed between said first anode outlet and said second anode inlet.

3. The fuel cell of system of claim 2, wherein said control valve is selectively operable between open and closed positions so that said first anode effluent can be selectively exhausted from said first fuel cell.

4. The fuel cell system of claim 2, wherein said control valve is selectively adjustable between a fully closed position and a fully open position for regulating said portion of said first anode effluent that forms said portion of said second anode reactant flow.

5. The fuel cell system of claim 1, further comprising a check valve in fluid communication with said second anode outlet and disposed downstream from said second fuel cell with said second anode effluent flowing therethrough, said check valve preventing back flow contamination of said second and first fuel cells.

6. The fuel cell system of claim 1, wherein said second anode reactant flow consists essentially of said first anode effluent.

7. The fuel cell system of claim 1, wherein said second anode reactant flow comprises an entire portion of said first anode effluent.

8. The fuel cell system of claim 1, wherein said first fuel cell is a PEM fuel cell.

9. The fuel cell system of claim 1, wherein said first and second cathode reactant flows originate from a common cathode reactant flow.

10. The fuel cell system of claim 1, wherein said second cathode reactant flow is ambient air.

11. A fuel cell system comprising:
an anode reactant flow having a hydrogen concentration;
a cathode reactant flow having an oxygen concentration;
a primary fuel cell that receives a primary anode reactant flow and a primary cathode reactant flow, said primary anode and cathode reactant flows originating from said anode and cathode reactant flows respectively, said primary fuel cell converting said primary reactant flows into electricity, a primary anode effluent having a first hydrogen concentration and a primary cathode effluent that are exhausted from said primary fuel cell; and
a secondary fuel cell receiving said primary anode effluent exhausted from said primary fuel cell and a secondary cathode reactant flow, said secondary fuel cell converting said primary anode effluent and said secondary cathode reactant flow into electricity, a secondary anode effluent having a second hydrogen concentration and a secondary cathode effluent that are exhausted from said secondary fuel cell, wherein said second hydrogen concentration is less than said first hydrogen concentration.

12. The fuel cell system of claim 11, further comprising a control valve disposed between said primary fuel cell and said secondary fuel cell, said control valve controlling the flow of said primary anode effluent from said primary fuel cell to said secondary fuel cell.

13. The fuel cell system of claim 11, further comprising a check valve disposed downstream from said secondary fuel cell with said secondary anode effluent flowing therethrough, said check valve preventing back flow contamination of said secondary fuel cell and said primary fuel cell.

14. The fuel cell system of claim 11, wherein said primary fuel cell and said secondary fuel cells are a same type of fuel cell.

15. A fuel cell system comprising:
an anode reactant flow having a hydrogen concentration;
a cathode reactant flow having an oxygen concentration;
a primary fuel cell that receives a primary anode reactant flow and a primary cathode reactant flow, said primary anode and cathode reactant flows originating from said anode and cathode reactant flows respectively, said primary fuel cell converting said primary reactant flows into electricity, a primary anode effluent and a primary cathode effluent that are exhausted from said primary fuel cell;
a secondary fuel cell receiving said primary anode effluent exhausted from said primary fuel cell and a secondary cathode reactant flow, said secondary fuel cell converting said primary anode effluent and said secondary cathode reactant flow into electricity, a secondary anode effluent and a secondary cathode effluent that are exhausted from said secondary fuel cell to the environment within which the fuel cell system is operating,
wherein said secondary fuel cell is a lower power fuel cell than said primary fuel cell.

16. The fuel cell system of claim 11, wherein a portion of said secondary cathode reactant flow is formed from a portion of said primary cathode effluent exhausted from said primary fuel cell.

17. The fuel cell system of claim 11, wherein said secondary cathode reactant flow originates from said cathode reactant flow.

18. The fuel cell system of claim 11, wherein said secondary cathode reactant flow is ambient air.

19. A method of converting an anode effluent produced in a primary fuel cell in a fuel cell system into an electrical current, the method comprising:
producing a first anode effluent having a first hydrogen concentration in a primary fuel cell;
routing a portion of the first anode effluent from the primary fuel cell to a secondary fuel cell;
supplying said secondary fuel cell with a cathode reactant flow; and
converting said portion of the first anode effluent and said cathode reactant flow into electricity and a second anode effluent having a second hydrogen concentration less than said first hydrogen concentration in said secondary fuel cell.

20. The method of claim 19, wherein, prior to routing a portion of the first anode effluent to said secondary fuel cell, the method further comprises:
routing all of the first anode effluent produced by the primary fuel cell through a control valve; and
controlling the flow of the first anode effluent from the primary fuel cell by selectively operating said control valve.

21. The method of claim 19, wherein routing a portion of the first anode effluent includes routing an entire portion of the first anode effluent to said secondary fuel cell.

22. The method of claim 19, wherein supplying said secondary fuel cell with a cathode reactant flow includes routing a portion of a cathode effluent exhausted from said primary fuel cell to said secondary fuel cell.

23. The method of claim 19, wherein supplying said secondary fuel cell with a cathode reactant flow includes supplying said secondary fuel cell with said cathode reactant flow from a common cathode source that is used to provide a cathode reactant flow to said primary fuel cell.

24. The fuel cell system of claim 11, wherein said secondary anode effluent is vented to the environment.

25. The method of claim 19, further comprising venting said second anode effluent to the environment.

26. A method of operating a fuel cell system, the method comprising:
(a) powering a primary electrical load with a first fuel cell operable to produce a first voltage;
(b) routing anode effluent from said first fuel cell to a second fuel cell operable to produce a second voltage less than said first voltage;
(c) powering a secondary electrical load with the second fuel cell, said secondary electrical load being lower than said primary electrical load; and
(d) venting anode effluent produced by said second fuel cell to the environment within which the fuel cell system is operating.

27. The method of claim 26, wherein (a) comprises supplying a first anode reactant stream and a first cathode reactant stream to said first fuel cell and (c) comprises supplying a second cathode reactant stream to said second fuel cell.

28. The method of claim 26, wherein (a) comprises producing a first anode effluent having a first hydrogen concentration with said first fuel cell, (b) comprises routing said first anode effluent to said second fuel cell, and (c) comprises producing a second anode effluent having a second hydrogen concentration with said second fuel cell, said second hydrogen concentration being less than said first hydrogen concentration.

* * * * *